United States Patent [19]

DeLoach et al.

[11] 4,051,812
[45] Oct. 4, 1977

[54] AUTOMATIC ANIMAL FEEDING APPARATUS

[76] Inventors: Guessman L. DeLoach; Phillip H. Foster, both of R.R. No. 3, Metter, Ga. 30439

[21] Appl. No.: 716,574

[22] Filed: Aug. 23, 1976

[51] Int. Cl.² .............................................. A01K 5/02
[52] U.S. Cl. .................................. 119/51.11; 119/51.5
[58] Field of Search ............. 119/51.11, 51.5, 52 AF; 222/64, 66

[56] References Cited

U.S. PATENT DOCUMENTS

| 2,642,837 | 6/1953 | Schroeder | 119/52 AF |
| 2,997,020 | 8/1961 | Barkman | 119/14.18 |
| 3,534,708 | 10/1970 | Cauffman | 119/51.11 |
| 3,561,403 | 2/1971 | Wilson, Jr. et al. | 119/51.11 |
| 3,762,373 | 10/1973 | Grossman | 119/51.11 |

*Primary Examiner*—Hugh R. Chamblee
*Attorney, Agent, or Firm*—Jones, Thomas & Askew

[57] ABSTRACT

An automatic animal feeding apparatus including a sensory mechanism comprising two sensors in the bottom of a feeding trough which sense the absence of food in the trough and activate a means for dispensing additional food into the trough.

11 Claims, 3 Drawing Figures

AUTOMATIC ANIMAL FEEDING APPARATUS

The present invention relates to devices for automatically providing feed to animals when required. The commonly used food for swine and other such animals comprises a dry feed that is mixed with water to form a slurry. Normally the slurry is provided to the animals in a feeding apparatus such as a feeding trough. The aim of an automatic feeding apparatus is to supply the slurry to the feeding trough so that it is available for consumption by the animals at any time the animals desire to eat. Ideally, the slurry is completely eaten and replaced relatively often, because slurry which is left to stand in the trough, or which remains uneaten and is covered by the addition of more slurry, is apt to spoil. This spoilage may injure feeding animals, especially young animals with sensitive digestive systems.

In the past, there has been provided a hopper having dry feed therein, and a trough into which the dry feed may be dispensed. After the dry feed has been placed into the trough, water may be introduced into the trough to mix with the dry feed and form the desired slurry. While such prior apparatus has been somewhat successful, it has been found that the water washes the dry feed to one end of the trough, thereby preventing the proper mixing of the slurry. It has also been found that conventional sensing devices which initiate the addition of further quantities of feed into the trough do not embody sufficient sensitivity and become clogged and non-functional during operation. A conventional sensing device comprises a pipe extending vertically down into a trough, to operate by having a small electric current pass between two sensors within the pipe when there is moist slurry therebetween. The addition of feed is initiated when the slurry level drops and the level of electric current between the sensors diminishes. The nature and orientation of the pipe sensing device also requires that the apparatus be activated before the animals eat all of the food in the trough. Slurry remaining in the trough during a plurality of such cycles may spoil.

It is an object of the instant invention to provide a trouble-free apparatus for automatically supplying animal feed into an animal feeding trough, wherein said feed is replenished whenever the level of said mixture in the trough falls below a level monitored by a sensing device.

It is a further object of the instant invention to provide an animal feeding apparatus capable of supplying a feeding trough with a well-mixed slurry comprised of dry animal feed and water.

It is a further object of the instant invention to provide a sensing device to initiate the addition of food into a feeding trough of an automatic animal feeding apparatus, said sensing device comprising two sensors so located in the feeding trough as to eliminate the possibility of any significant amount of moist feed remaining in the feeding trough when the content of the feeding trough falls below a predetermined level at which the sensors initiate the addition of more feed, and so located as to eliminate the possibility of conductive feed becoming trapped between the sensors.

It is a further object of the instant invention to provide electronic controls for an automatic animal feeding apparatus to allow adjustment of the composition of animal feed dispensed to the animals.

Other objects, features and advantages of the present invention will become apparent from the following detailed description and the accompanying drawings in which.

Figure 1:
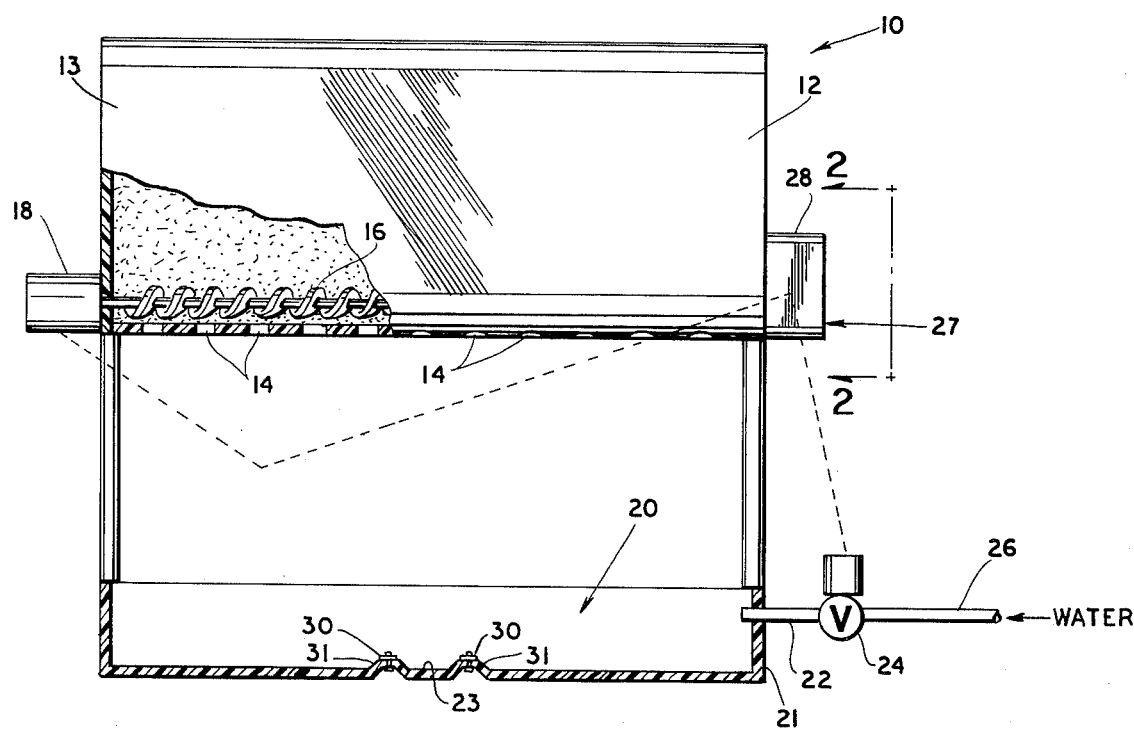
FIG. 1 is a partial cross-sectional view of an automatic animal feeding apparatus embodying this invention showing portions of the hopper broken away.

According to the present invention and referring to the drawings, an animal feeding apparatus 10 of the present invention includes a dispensing means 12, a receptacle 20, and a control means 27 for controlling the automatic operation of the apparatus 10. The dispensing means 12 comprises a hopper 13 for receiving and retaining dry feed in a position over receptacle 20 and a water pipe 22. The hopper 13 includes a plurality of holes 14 in the bottom surface thereof, and an auger 16 positioned generally parallel to the bottom for agitating material within the hopper 13 so that the material will fall through the holes 14 and into receptacle 20. An electric motor 18 is connected to the auger 16 to rotate the auger according to a schedule as determined by control means 27.

Receptacle 20 is positioned beneath hopper 13 to receive feed as it falls from hopper 13. Water pipe 22 is positioned in side wall 21 of receptacle 20 to dispense water into the receptacle according to a schedule as determined by control means 27. Activation of water pipe 22 is accomplished through solenoid valve 24 which interrupts or permits the flow of water through pipe 22 from water supply 26. The solenoid valve 24 is connected through appropriate wiring (not shown) to the control means 27.

A pair of sensors 30 are positioned on the bottom surface 23 of receptacle 20. The sensors 30 are metallic strips elevated slightly above the surface 23 on feet 31, a distance apart sufficient to allow feed to be eaten from between the sensors. The feet 31 may be a raised portion of the surface 23 if the receptacle 20 comprises a non-conductive material such as fiberglass or the like, as shown in FIG. 1. The feet 31 may alternatively comprise small insulating blocks if the receptacle 20 comprises a conductive material such as metal. The sensors are connected through appropriate wiring (not shown) to the control means 27.

Figure 2:
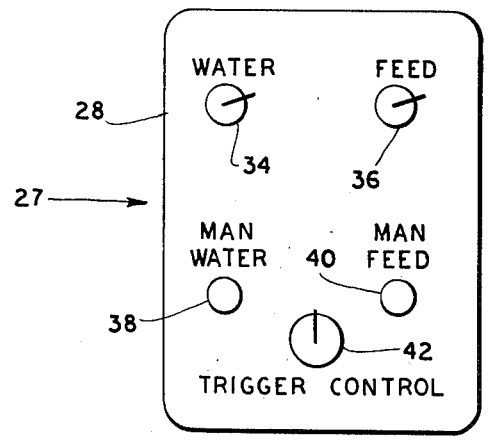
FIG. 2 is a diagrammatic representation of a control panel showing the operating controls for the present invention.
Figure 3:
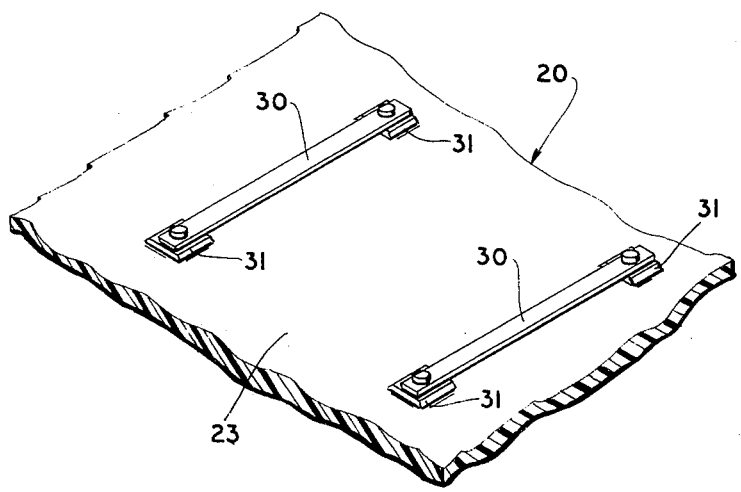
FIG. 3 is a perspective view of a portion of the floor of the receptacle of the present invention showing the sensing devices.

Control means 27 is best shown in FIG. 2 and generally comprises a control box 28 containing appropriate circuitry for controlling the dispensing means according to a desired schedule. Box 28 includes a water control switch 34 which determines the length of time solenoid valve 24 remains open after it is actuated, and a feed control switch 36 which determines the length of time the motor 18 operates to dispense dry feed into the receptacle 20 after the switch is actuated. Push buttons 38 and 40 provide manual overrides to admit water and/or feed as desired without regard to the automatic control circuitry. The control box 28 includes solid state electrical components for greater reliability under the circumstances of use for the apparatus of this invention. Trigger control 42 is provided to set a variable level of actuation for water control switch 34 and feed control switch 36.

Appropriate electrical circuitry in the control means 27 provides a constant potential difference across the sensors 30. Sensors 30 are therefore electrically interconnected by the presence of moist feed between the sensors with the water in the feed functioning as the conducting medium for the flow of electrical current. The flow of current between the sensors decreases when the food falls to a level below the metal strips, and this decrease in current flow is a signal to the electrical circuitry in the control means 27 to begin admitting water and the dry feed to create additional slurry feed. Since it is the drop in current flow that determines when feed is added, it should be understood that trigger control 42 is responsive to a decrease in current and may be adjusted to trigger the addition of water and feed according to a selected decrease in current.

Additionally, it should be understood that animal areas where the feed apparatus would be located are quite dusty and dirty, and electro-mechanical apparatus is subject to malfunction due to excess foreign matter. Thus, the control means 27 comprises solid state electronic components for greater reliability.

From the foregoing, it should now be understood that, when the feed in receptacle 20 has been eaten to a level sufficiently low as determined by the setting of the trigger control 42, the sensors 30 will transmit a signal to control means 27, which will cause the solenoid valve 24 to be opened for a predetermined length of time as determined by the water control switch 34. In this length of time, a certain amount of water will be admitted to the receptacle 20. There will then be a lapse of time so the water can settle and become still. Following this lapse of time, the motor 18 will be energized to cause dry feed to be introduced into the receptacle 20 through the distribution holes 14. Feed will be dispensed for a predetermined length of time as determined by the feed control switch 36, and the cycle will be ended. The animals may then feed until the level of slurry is so low that the current decreases to a level below the setting of the trigger control 42, at which time the control means 24 again dispenses water and dry feed into the receptacle 20.

While this invention has been described in detail with particular reference to preferred embodiments thereof, it will be understood that variations and modifications can be affected within the scope and spirit of the invention as described hereinbefore and as defined in the appended claims.

We claim:

1. An animal feeding apparatus including a receptacle having a bottom, means for dispensing conductive animal food into the receptacle, a pair of conductive sensors mounted upon the bottom of the receptacle, means for controlling the dispensing means according to information received from the sensors, means for establishing a flow of electric current between the sensors when conductive food is positioned between the sensors, and means for operating the controlling means to cause the dispensing means to dispense additional food into the receptacle in response to the electric current flowing between the sensors falling below a predetermined level when the level of food within the receptacle is reduced, said predetermined current level being selected to require substantially all of the food within the receptacle to be removed before said predetermined current level is reached.

2. The apparatus as defined in claim 1 wherein the receptacle comprises non-conductive material.

3. The apparatus as defined in claim 1 wherein the receptacle comprises conductive material and the sensors are mounted on insulating material.

4. The apparatus as defined in claim 1 wherein the sensors comprise conductive members mounted a distance apart sufficient to allow food to be removed from between the two sensors.

5. The apparatus as defined in claim 1 wherein the means for dispensing conductive animal food includes means for dispensing food into the receptacle from above the receptacle, approximately uniformly over the surface area of the receptacle, sequentially upon call.

6. The apparatus as defined in claim 1 wherein the means for dispensing conductive animal food comprises a means for dispensing dry food into the receptacle from above the receptacle, approximately uniformly over the surface area of the receptacle sequentially upon call, and a means for dispensing water into the receptacle, whereby dry food may be added subsequent to the addition of water to form an approximately uniform mixture in the receptacle.

7. The apparatus as defined in claim 6 wherein the means for dispensing dry food comprises a hopper having a plurality of holes in the bottom thereof, a rotatable auger within the hopper directly above the holes in the hopper connected to an electric motor, whereby the dry food may be agitated to fall through the holes into the receptacle.

8. The apparatus as defined in claim 6 wherein the means for dispensing water into the receptacle comprises a water pipe extending through a side of the receptacle, a solenoid valve connected to said pipe, and a water supply connected to said solenoid valve.

9. The apparatus as defined in claim 1 wherein the means for controlling the dispensing means according to information received from the sensors comprises means for driving electric current between the sensors, means for measuring said current, and means for activating the dispensing means for a predetermined period when said current falls below a predetermined value.

10. The apparatus as defined in claim 9 wherein the controlling means includes means for adjusting the duration of operation of the dispensing means and means for adjusting the level of current at which the controlling means activates the dispensing means.

11. An animal feeding apparatus including a receptacle, means for dispensing conductive animal food into the receptacle from above the receptacle and approximately uniformly over the surface of the receptacle, a pair of conductive sensors mounted upon insulators connected to the bottom of the receptacle separated by a distance sufficient to allow food to be removed from between the sensors, means for driving electric current between the sensors, means for measuring said current, controlling means for activating the dispensing means for a predetermined period when said current falls below a predetermined value, means for adjusting the duration of operation of the dispensing means and means for adjusting the level of current at which the controlling means activates the dispensing means.

* * * * *